(12) United States Patent
Kumar et al.

(10) Patent No.: US 11,740,942 B2
(45) Date of Patent: Aug. 29, 2023

(54) SMART DEPLOYMENT OF INDUSTRIAL IOT WORKLOADS

(71) Applicant: Amazon Technologies, Inc., Seattle, WA (US)

(72) Inventors: Lomash Kumar, Redmond, WA (US); Muhammad Usman Anwer, Seattle, WA (US); Nicolas Pouyez, Bainbridge Island, WA (US); Yazan Damiri, Seattle, WA (US); Rahul Nambiar, Vancouver (CA); Glenn Danthi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/116,933

(22) Filed: Dec. 9, 2020

(65) Prior Publication Data

US 2022/0179697 A1 Jun. 9, 2022

(51) Int. Cl.
*G06F 9/50* (2006.01)

(52) U.S. Cl.
CPC ............ *G06F 9/505* (2013.01); *G06F 9/5044* (2013.01); *G06F 9/5072* (2013.01); *G06F 9/5083* (2013.01)

(58) Field of Classification Search
CPC ...... G06F 9/505; G06F 9/5044; G06F 9/5072; G06F 9/5083
See application file for complete search history.

(56) References Cited

U.S. PATENT DOCUMENTS

| | | | |
|---|---|---|---|
| 2017/0017522 A1* | 1/2017 | Daga | G06F 9/46 |
| 2017/0083386 A1 | 3/2017 | Wing et al. | |
| 2017/0201585 A1 | 7/2017 | Doraiswamy et al. | |
| 2019/0205172 A1 | 7/2019 | Arolovitch | |
| 2019/0220321 A1 | 7/2019 | Yang | |
| 2020/0296155 A1 | 9/2020 | McGrath et al. | |
| 2020/0379805 A1* | 12/2020 | Porter | G06F 9/5061 |
| 2021/0099542 A1* | 4/2021 | Watt | H04L 41/5054 |

OTHER PUBLICATIONS

International Search Report and Written Opinion dated Mar. 25, 2022 in International Patent Application No. PCT/US2021/062428, Amazon Technologies, Inc., pp. 1-11.

* cited by examiner

*Primary Examiner* — Sisley N Kim
(74) *Attorney, Agent, or Firm* — Robert C. Kowert; Kowert, Hood, Munyon, Rankin & Goetzel, P.C.

(57) ABSTRACT

A workload adaptation service of a provider network may perform smart deployment of industrial an IoT workload across resources of a provider network and a client network. The workload adaptation service may receive, from a user, an indication of one or more constraints for performance of a workload (e.g., daily upload limit, maximum acceptable latency). The service determines a deployment for the workload across client resources and provider resources based at least on the constraints. The service deploys portions of the workload to the client network and other portions to the provider network according to the deployment. The workload adaptation service may also perform dynamic adaptation of the IoT workload by moving portions of the workload from the client network to the provider network or vice-versa, based on workload performance metrics or based on changes to the available resources.

20 Claims, 10 Drawing Sheets

| Running at Client Network/Edge | Running at Provider Network |
|---|---|
| Lower latency when making decisions that impact edge operations. | Higher latency when input and output of a decision exist at the edge but the processing happens in the cloud. |
| Interruptions to internet connectivity has minimal impact. | Interruptions to internet connectivity has fundamental impact. |
| Internet bandwidth constraints and cost have minimal impact. | Internet bandwidth constraints and cost have fundamental impact. |
| High cost of set up. Getting started needs a lot of investment planning. | Low cost of set up. Getting started is easy as infrastructure is mostly managed. |
| Low elasticity. Customers have to predict their usage over years to optimize investment. | High elasticity. Customers pay for what they use. |
| Archival of cold data, backups, redundancy, etc. are explicit investments. | Archival of cold data, backups, redundancy, etc. are native cloud offerings. |
| Cost of experimentation is high. | Cost of experimentation is low with wide array of offerings and pay as you go model. |
| Operational cost is high. | Operational cost is low due to efficiencies of scale. |

FIG. 2

```
"outputs": [ //what needs to be calculated at edge vs. provider network
    {"variable": "m1.5MinAvgT", "location": "EAI-1"},
    {"variable": "m1.5MinAvgH", "location": "EAI-2"},
    {"variable": "m1.5MinAvgP", "location": "EAI-2"},
    {"variable": "m1.steamalarm", "location": "EAI-2"},
    {"variable": "m1.OverallHealth", "location": "US-West.service1"},
],
"connections": [ //what needs to be routed from edge to provider network
    {"source": {"config for OPCUA1"}, "destination": "EAI-1"},
    {"source": {"config for OPCUA2"}, "destination": "EAI-2"},
    {"source": {"EAI1.m1.5MinAvgT"}, "destination": "US-West.service1.m1.5MinAvg"},
    {"source": {"EAI2.m1.5MinAvgH"}, "destination": "US-West.service1.m1.5MinAvg"},
    {"source": {"EAI2.m1.5MinAvgP"}, "destination": "US-West.service1.m1.5MinAvg"},
]
```
— 502

FIG. 5

SMART DEPLOYMENT OF INDUSTRIAL IOT WORKLOADS

BACKGROUND

The Internet of Things (IoT) is a phrase given for the interconnection of computing devices scattered around the globe within the existing internet infrastructure. Clients of a remote service provider may leverage the internet-based connectivity of IoT devices by using a service offered by the service provider's network to perform a workload (e.g., data analysis software). For example, temperature and pressure sensors installed on a machine at a client's manufacturing facility may collect temperature and pressure values and transmit them to the service provider for analysis by a data analytics service that analyzes the temperature and pressure values.

In some cases, an organization may desire to run a workload locally, using their own computers of their local network. For example, a manufacturer may decide to run data analysis software using their own hardware (industrial PCs, servers, etc.) in order to analyze temperature and pressure values collected from sensors at a machine. This may allow the manufacturer to have low-latency access to the data collected from the sensors, and avoids the need to rely on an internet connection to a provider network of a service provider. However, the client's hardware that is used to run the data analysis software may not be as efficient as higher-end hardware used by a service provider and the client's hardware may be more expensive to install and to maintain. Therefore, a manufacturer is faced with accepting lower performance for different aspects of their workload, depending on whether they choose to run the workload using their local hardware resources or using a service provider's resources.

BRIEF DESCRIPTION OF THE DRAWINGS

FIG. 2 is a chart illustrating some benefits and drawbacks of running workloads at a client network or a provider network, according to some embodiments.

FIG. 5 is an illustration of a deployment model definition, according to some embodiments.

Figure 1:
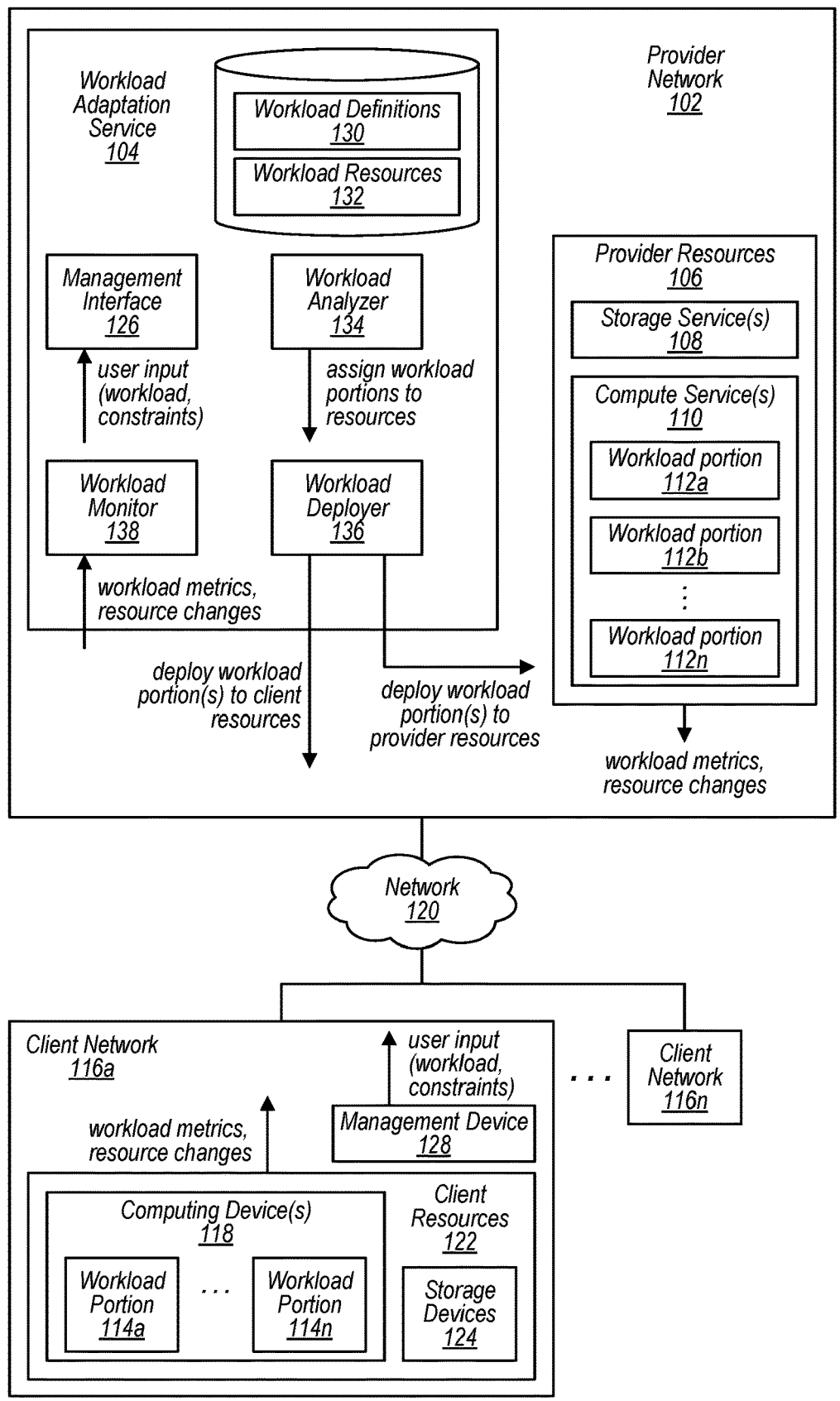
FIG. 1 is a logical block diagram illustrating a system for smart deployment of industrial IoT workloads across resources, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for smart deployment of industrial IoT workloads across resources, according to some embodiments. In embodiments, a workload adaptation service may perform smart deployment of industrial an IoT workload across different resources of different networks (e.g., across resources of a client network an industrial/manufacturing environment and across resources of a service provider network), resulting in improved performance of the workload with respect to one or more performance measurements compared to traditional techniques (e.g., executing a workload entirely on service provider network). For example, the amount of time for the workload to process a given amount of data may be reduced by deploying/executing one or more portions of the workload at the client's local network and deploying/executing one or more other portions of the workload at the service provider's network. As discussed herein, various other aspects of performance may be improved/optimized by deploying different portions of the workload across different resources and/or networks (e.g., reduced latency for obtaining data, reduced time to perform computations).

In some embodiments, a workload adaptation service may perform dynamic adaptation of an IoT workload by moving (e.g., migrating) one or more portions of the workload from one resource to another resource (e.g., from a resource at the provider network to a resource at the client network). For example, the service may move one or more portions of the workload based on analyzing execution metrics for the workload or based on analyzing a change in the available resources for executing the workload.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 10 and described below.

This specification begins with a description of a system for smart deployment of industrial IoT workloads across resources. A number of different methods and techniques for smart deployment of industrial IoT workloads across resources are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for smart deployment of industrial IoT workloads across resources, according to some embodiments.

As shown, a provider network 102 includes a workload adaptation service 104 that implements smart deployment of industrial IoT workloads across resources. In the example embodiment, the provider network 102 also includes any number of provider resources 106, including any number of storage services 108 and any number of compute services 110. As shown, the compute services 110 may execute any number of workload portions 112 for any number of workloads. In an embodiment, workload portions 112a and 112b are executed as part of a particular workload of the client, while other portions 114 of the workload are executed at the client's network (e.g., client network 116a). For example, a computing device 118 may execute workload portion 114a to process temperature measurements at various locations of an industrial/manufacturing facility to generate an average temperature from multiple collected values. The average temperature may then be transmitted via a wide area network 120 (e.g., the internet) to the workload portion 112b, which processes the average temperature along with other data to generate a result (stored at the storage service 108).

In the depicted embodiment, a client network (e.g., client network 116a) may include any number of client resources 122, including any number of storage devices 124 and any number of computing devices 118. As shown, the computing devices 118 may execute any number of workload portions 114 for any number of workloads. Furthermore, any number of clients of the workload adaptation service 104 may use the workload adaptation service 104 by communicating with the provider network 102 from a remote network 116 of the corresponding client (e.g., via the network 120).

The workload adaptation service 104 includes a management interface 126 (e.g., application programming interface (API)) that may receive user input from a management device 128 of a remote client network. For example, a user may provide input via a graphical user interface or command line interface of a display device. In the example embodiment, the interface 126 receives user input from the management device 128 of the client network 116a of a client.

In embodiments, the user input indicates one or more constraints for performance of a workload (e.g., daily upload limit, maximum latency between different portions). The user input may also indicate the workload to be performed. For example, the user may provide a workload definition that specifies the work to be performed by the workload. In embodiments, the workload definition includes program code and/or any type of language or other metadata that describes the work to be performed during execution of the workload.

In some embodiments, the user may indicate the workload to be performed by selecting a pre-defined workload definition 130 (e.g., template) stored by the workload adaptation service 104. In embodiments, the user may indicate changes to the workload definition 130 to create a customized version of the workload. For example, the user may add and/or remove program code.

The workload adaptation service 104 may also store a record of the workload resources (e.g., provider resources 106 and/or client resources 122) that are available to clients for deployment and execution of portions of the workload. For example, the workload resources 132 for a particular client may indicate the compute services 110 and the computing devices 118 that are available for that client. In embodiments, the user may indicate, via user input, the workload resources (e.g., provider resources 106 and/or client resources 122) that are available to the client for deployment and execution of portions of the workload (if the workload adaptation service 104 does not have a record of the available resources or is otherwise unaware of them).

After receiving, from a user, one or more constraints for a workload (and/or any other additional input described herein such as an indication of the workload), a workload analyzer 134 of the workload adaptation service 104 may determine a deployment model for the workload based on one or more criteria (e.g., taking into account each criterion). For example, the workload adaptation service may determine a deployment model (e.g., optimal deployment model) for the workload based on analysis of the workload to be performed (e.g., as indicated by the user), one or more available client resources of the remote network of the client, one or more available provider resources of the provider network, and/or the one or more constraints for performance of the workload.

In embodiments, the service may determine, based on one or more performance measures (e.g., as predicted by the service based on machine learning and/or previous performance of the same/similar deployment models), the deployment model to be an "optimal" deployment model. The optimal deployment model may indicate a deployment of different portions of the workload across provider resources and/or client resources that results in the best performance and/or that results in better performance during execution of the workload (e.g., with respect to one or more performance measures) compared to the resulting performance for one or more alternative deployments of the different portions of the workload across the provider resources and/or client resources (e.g., assigning workload portions A and B for deployment to a client resource versus a provider resource).

For example, the optimal deployment model for a particular workload may result in the lowest/lower time needed to process a given data for one or more workload portions or the entire workload (e.g., data collected at the client network), may result in the lowest/lower usage of (or cost to use) the resources to process a given amount of data for one or more workload portions or the entire workload (e.g., data collected at the client network), and/or may result in the most accurate/more accurate results from processing given data for one or more workload portions or the entire workload (e.g., data collected at the client network). Therefore, the phrase "deployment model" may be replaced by the phrase "optimum deployment model" and vice-versa, in various embodiments.

In some embodiments, the optimal deployment model indicates an assignment of one or more portions of the workload for deployment to one or more of the client resources and an assignment of one or more other portions of the workload for deployment to one or more of the provider resources. For example, the optimal deployment model for workload A (which may include five different portions) may be to assign three portions to the provider resources (e.g., workload portions 112a, 112b, and 112n assigned to a compute service 110) and to assign the other two portions to the client resources (e.g., workload portions 114a and 114n assigned to a computing device 118).

After each of the portions of the workload are assigned to either the provider resources or the client resources, a workload deployer 136 may deploy the each portion to its assigned resource. For example, the workload deployer 136 may deploy workload portions 112a, 112b, and 112n to compute service 110 and may deploy workload portions 114a and 114n to the computing device 118. After each of the workload portions is deployed to its destination resource, it may be executed. In some embodiments, the workload adaptation service may initiate execution of some or all of the workload portions (e.g., by sending a command or to perform another action that causes the workload portions to begin execution).

In some embodiments, instead of or in addition to deploying each portion to its assigned resource, the service may send an indication of the deployment model to a destination (e.g., to be displayed to a user at the management device 128). This may inform the user of the assignments/deployment locations. In embodiments, the potions are not deployed to the assigned resources unless the user sends an indication to deploy the portions (e.g., after the user approves of the deployment model/assignments).

In various embodiments, a user may provide any suitable constraint(s) for performance of the workload. In an embodiment, the user may indicate that at least one of the portions of the workload is to be executed at the remote network of the client (e.g., at any of the available computing devices/ resources or at a particular computing device/resource) and/or at least one of the portions of the workload is to be executed at the provider network (e.g., at any of the available compute services/resources or at a particular compute service/resource). For example, the user may indicate that workload portion 112a is to be executed at the provider network (e.g., at one of the available provider resources) and that workload portion 114a is to be executed at the client network (e.g., at one of the available client resources). When determining the optimal deployment model for the workload, the workload adaptation service 104 may assign any of the remaining workload portions to either the provider resources or the client resources. In the depicted example, the service may assign portions 112b and 112n of the workload to the provider resources (compute service 110) and may assign portion 114n to the client resources (computing device 118).

In embodiments, the user may indicate a bandwidth constraint for performance of the workload. For example, the user may indicate a maximum amount of data that can be uploaded from the network of the client to the provider network over a predefined period of time (e.g., daily limit, hourly limit, per second limit) and/or a maximum amount of data that can be downloaded to the network of the client from the provider network over a predefined period of time. For example, the user may indicate a daily upload and download limit to the provider network of 500 GB. If the service determines, based on analysis, that the expected amount of daily data output from a workload portion 112a (e.g., a function) to workload portion 112b is greater than 500 GB (the daily upload and download limit), then the service may assign/deploy workload portions 112a and 112b to the same resource and/or network (e.g., compute service 110).

In some embodiments, the user may indicate a maximum allowed latency as a constraint for performance of the workload. For example, the user may indicate a maximum amount of latency that can occur between two different portions of the workload. For example, the user may indicate a maximum amount of time for an output of a function of one workload portion to be received by another function of another workload portion. In embodiments, the workload adaptation service 104 may assign/deploy workload portions 112a and 112b to the same resource and/or network (e.g., compute service 110) because the maximum latency between those two portions would be exceeded if one of them was deployed to the client network and the other was deployed to the provider network (due to the time required to transmit data from a remote network across the internet to a distant location).

In embodiments, the user may indicate a compute capacity constraint for the performance of the workload. For example, the user may indicate a minimum amount of compute capacity to be available for at least one of the portions of the workload. The compute capacity may be defined according to any suitable metric. In embodiments, the user may indicate a maximum time required for one or more workload portions executed by the resource to process a given amount of data and/or one or more hardware specifications of the resource (e.g., a hardware class of the resource). For example, the user may indicate processor speed, processor model/type, server model/type, processor manufacturer, etc. In embodiments, the service may assign/ deploy a particular workload portion to the provider resources at least because the client resources do not meet the compute capacity constraint (e.g., the client resources are unable to process data within a minimum amount of time and/or the client resources do not meet the minimum hardware specifications such as minimum processor speed, certain acceptable processor or server models/types/manufacturer).

In some embodiments, the user may indicate a storage capacity constraint for the performance of the workload. For example, the user may indicate a minimum amount of storage capacity (in MB, GB, TB, etc.) to be available for at least one of the portions of the workload. If the client resources do not have sufficient storage capacity indicated for a particular workload portion(s), then the service may assign the particular workload portion(s) to provider resource(s).

As discussed below, the workload adaptation service may perform dynamic adaptation of an IoT workload by moving (e.g., migrating) one or more portions of the workload from one resource to another resource (e.g., from a resource at the provider network to a resource at the client network or vice-versa). In embodiments, the portion(s) may be moved during execution of the workload. In some embodiments, some or all of the portions of the workload may be stopped/ paused, the portion(s) may be moved/re-deployed, and then the workload may be started/resumed.

In an embodiment, the service may obtain metrics (e.g., at a workload monitor) based on execution of the workload (e.g., latency between different portions, time required for one or more portions to process/output data, accuracy of results for one or more portions). The service may analyze the metrics and identify, based on the analysis, at least one of the portions of the workload at the provider resources that, if executed at the client resources, would reduce an amount of time for the workload to process data. For example, a workload portion that processes sensor data may be moved from the provider network to the client network, allowing it to receive the data faster and to generate/cause a result with less delay (e.g., moving a robot arm).

Conversely, the service may analyze the metrics and identify, based on the analysis, at least one of the portions of the workload at the client resources that, if executed at the provider resources, would reduce an amount of time for the workload to process data. For example, a workload portion that performs highly complex computations may be moved from the client network to the provider network, allowing the workload portion to be executed on more powerful servers (allowing for faster computation of results).

In embodiments, the workload adaptation service may detect a change in the client resources and/or the provider resources (e.g., at a workload monitor). For example, a resource(s) may fail, may be removed, may be replaced, may be upgraded, and/or a new resource(s) may be added. In response to the detection, the service may analyze the client resources and/or the provider resources (taking into account the changed that were detected). Based on the analysis, the service may identify at least one of the portions of the workload at the client resources that, if executed at the provider resources (e.g., at a newly added upgraded resource), would reduce an amount of time for the workload to process data. In response to identifying the at least one of the portions of the workload, the service may move the at least one of the portions of the workload to at least one of the provider resources (e.g., to the newly added or upgraded resource that allows the portion(s) to process data faster).

In some embodiments, based on the above analysis of the client resources and/or the provider resources (taking into account the changed that were detected), the service may identify at least one of the portions of the workload at the provider resources that, if executed at the client resources (e.g., at a newly added upgraded resource), would reduce an amount of time for the workload to process data. In response to identifying the at least one of the portions of the workload, the service may move the at least one of the portions of the workload to at least one of the client resources (e.g., to the newly added or upgraded resource that allows the portion(s) to process data faster)).

In various embodiments, the workload adaptation service may use one or more machine learning (ML) models to improve one or more performance aspects of a workload over time. For example, the workload analyzer may periodically and/or at certain times cause the service to re-assign/re-deploy one or more workload portions from a client resource to a provider resource or vice-versa. The workload analyzer may use an ML model to determine, based on current workload metrics and/or recent resource changes and based on previous improvements in workload performance due to re-assignment/re-deployment of workload portions, one or more re-assignments/re-deployments of workload portions that will improve one or more performance aspects of the workload.

In embodiments, the service may determine that recently collected metrics for a currently executing workload are similar in one or more aspects to previously collected metrics for a previous deployment of the same workload. In response, the service may re-assign/re-deploy one or more portions of the workload based on a re-assignment/re-deployment of the one or more portions during the previous deployment that resulted in an improvement for one or more performance aspects of the workload.

In some embodiments, a workload may perform any number of functions to process data collected and/or generated from one or more data sources (e.g., sensors and/or other data sources of an industrial environment such as a manufacturing facility). For example, one or more portions of the workload may perform one or more filtering operations, aggregation operations, and/or other calculations/operations on the data to process the data.

In various embodiments, a workload may be a type of industrial IoT workload also referred to as a "dataflow." A data flow may represent a workload in which industrial equipment data is processed (e.g., filtering, aggregation, metrics calculations) and routed. In embodiments, the data may be viewed by a user at any step of processing (e.g., via an API call and/or user interface). In embodiments, a dataflow may perform any number of data processing functions (e.g., read data, filter data, write data to the provider network). In some embodiments, any number of dataflows may be interfaced and/or combined together to realize more complex flows, allowing a client to abstract details as they build a more sophisticated workload/workflow.

FIG. 2 is a chart 200 illustrating some benefits and drawbacks of running workloads at a client network or a provider network, according to some embodiments.

Running a workload (e.g., processing data collected by sensors or other data sources of a client network) using client resources of a client network (e.g., using "edge" computing devices at a client's industrial/manufacturing site) may have various drawbacks and advantages compared to running a workload using provider resources of a provider network. For example, when a workload runs at a client network, there is lower latency for results/decisions that affect operations at the local client network. While a provider network has more powerful computing power to process data more quickly and accurately, there is a higher latency for results/decisions because input data is transmitted to the provider network and the output data (a result/decision) is transmitted back to the client network.

When a workload runs at a client network, any interruption to internet connectivity has little or no impact on the workload performance. However, when a workload runs at a provider network, an interruption to internet connectivity may cause a failure in performing local operations due to the inability to receiving a result/decision. When the workload runs at a client network, internet bandwidth constraints or internet bandwidth costs have little or no impact on the workload performance or costs. However, when a workload runs at a provider network, internet bandwidth constraints or internet bandwidth costs have a large impact on the performance.

In various embodiments, running a workload at a client network may have higher associated set up costs compared to running the workload at the provider network. Running a workload at a client network may have much lower elasticity compared to running the workload at a provider network, since the provider network can more easily scale resources when needed. Running a workload at a client network may be associated with higher management costs for data storage, system operations, and experimentation. However, running the workload at a provider network may lower these management costs, due to the variety of scalable resources available.

In embodiments, a client may decide to run big data workloads at the provider network. For example, a machine learning (ML) algorithm that processes terabytes of data may be run in the cloud to benefit from elasticity, scalability and efficiencies of scale. A client may wish to run a high fidelity/high frequency algorithm at the edge (client network). For example, an algorithm that computes average for a 50 KHz signal needs to run at the edge to reduce the amount of data going to the cloud. In some cases, a client may want to archive data in the cloud for global access and built in redundancies. In embodiments, a client may wish to reduce the cost of using a provider network for data analytics and machine learning by sending only the data needed or only data of interest. As described herein, a client may use a workload adaptation service to address the above issues, by automatically determining the optimal placement of different portions of a workload and/or by allowing a user to specify that a particular workload portion is to be deployed to a particular resource.

Figure 3:
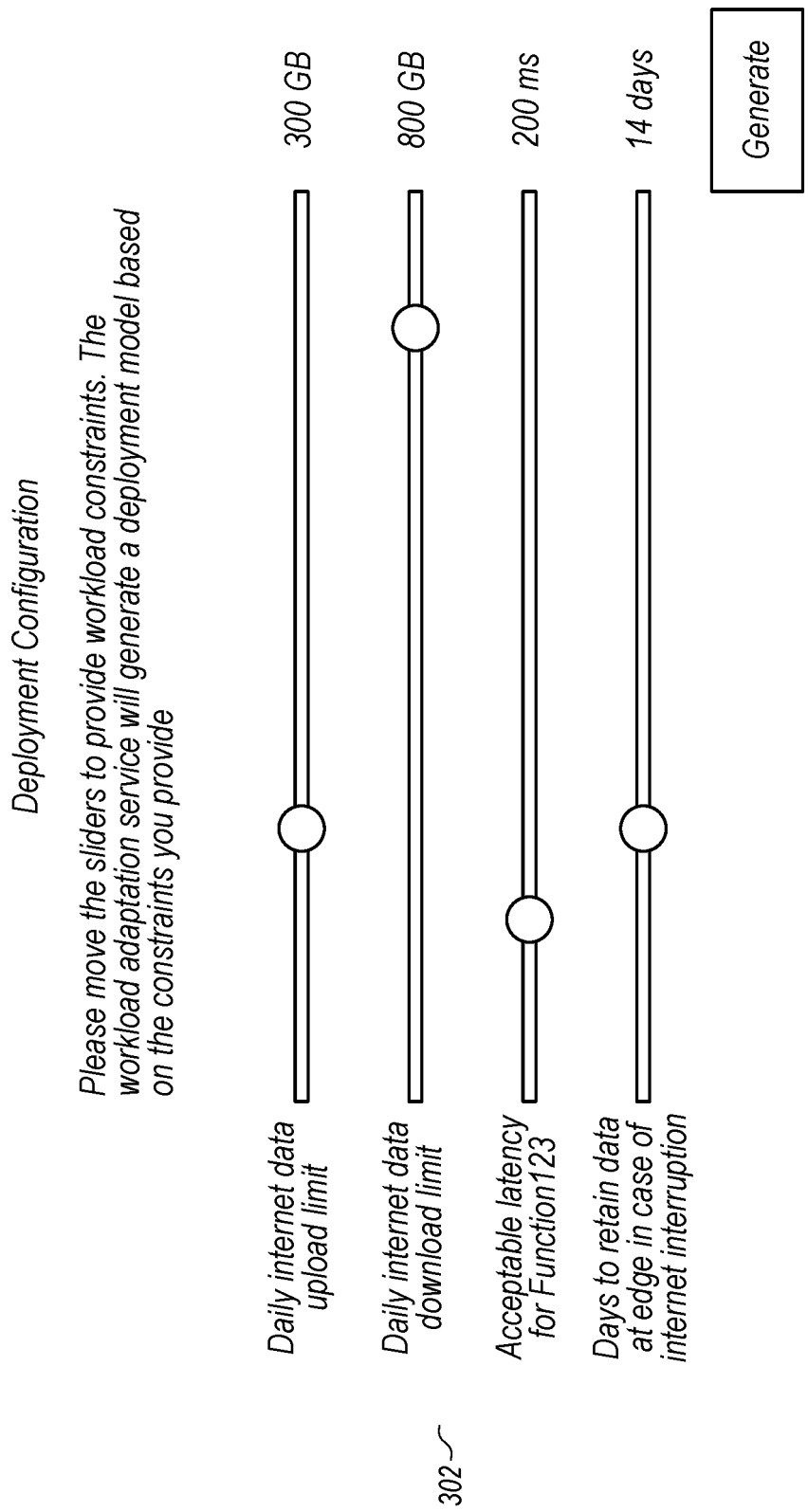
FIG. 3 is an illustration of a user interface for smart deployment of industrial IoT workloads across resources, according to some embodiments.

FIG. 3 is an illustration of a user interface 302 for smart deployment of industrial IoT workloads across resources, according to some embodiments.

In the depicted embodiment, a user interface may be provided by the workload adaptation service for display to a user (e.g., via a management device) that allows the user to specify a value for multiple constraints. Although four constraints are shown, in embodiments any number of constraints may be available for a user to adjust.

In the example embodiment, a user may adjust a slider button to adjust the value for a daily internet data upload limit (currently set to 300 GB), a daily internet data download limit (currently set to 800 GB), an acceptable latency for retrieving a result of function "Function123" (e.g., retrieval of the result by another portion/processing function of the workload), and a number of days to retain data at the client network in case of an internet interruption.

After engaging the "Generate" button (e.g., via a mouse-click), the workload adaptation service may determine an optimal deployment model and assign different workload portions to different resources based on the constraints (as described herein). Although a slider interface is shown, any other interface suitable for accepting user input may be used (e.g., command line interface, other types of graphical interfaces).

Figure 4:
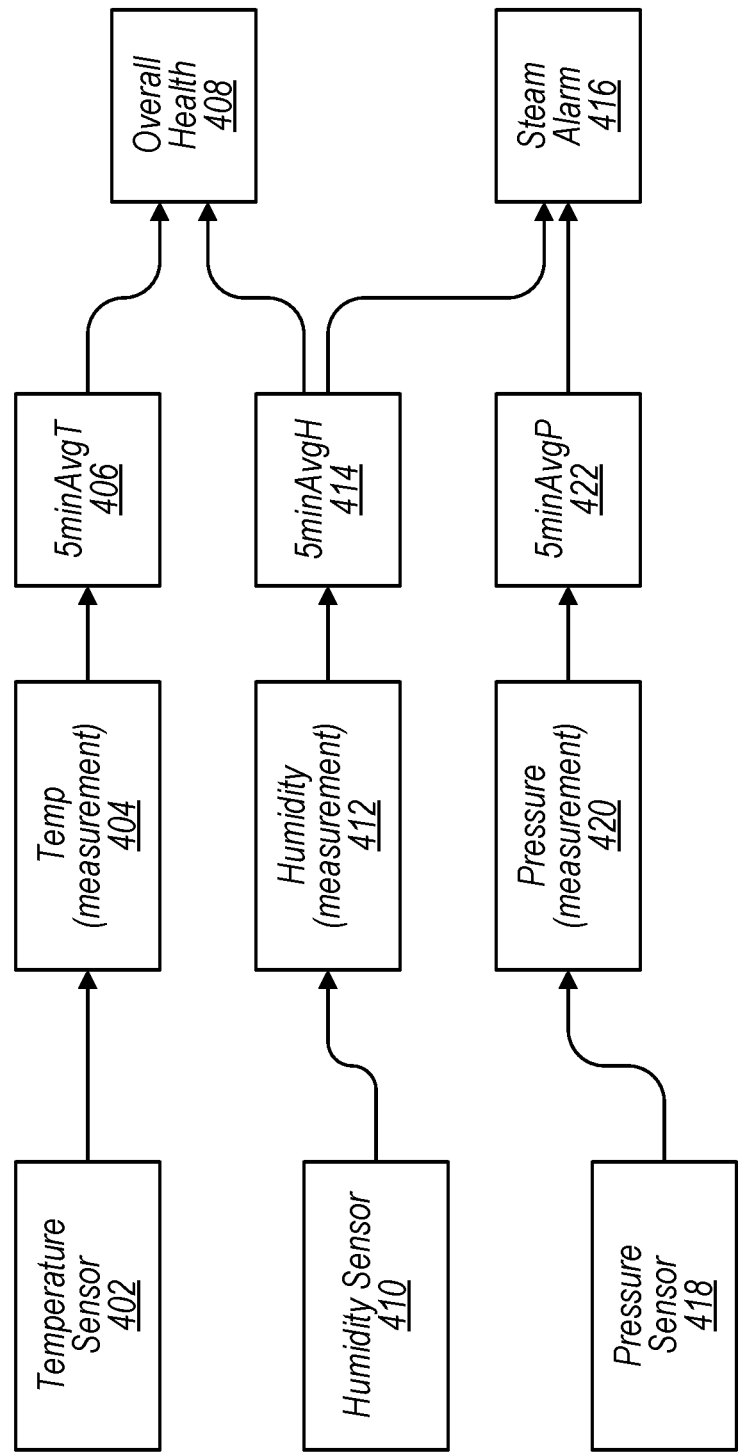
FIG. 4 is an illustration of a workload definition, according to some embodiments.

FIG. 4 is an illustration of a workload definition, according to some embodiments.

In the depicted embodiment, the workload definition is graphically represented using boxes that represent different functions, objects, or values and arrows that represent the flow of data. In embodiments, any suitable representation may be used to define a workload (e.g., a language or graph). In embodiments, a workload may also be referred to as a "dataflow."

As shown, the workload averages measurements from sensors and performs two different functions based on the averages. A temperature sensor 402 provides temperature measurements 404 to the "5minAvgT" function 406, which sends an average temperature to the overall health function 408 every 5 minutes. A humidity sensor 410 provides humidity measurements 412 to the "5minAvgH" function 414, which sends an average humidity to the overall health function 408 as well as to the steam alarm function 416 every 5 minutes. A pressure sensor 418 provides pressure measurements 420 to the "5minAvgP" function 422, which sends an average pressure to the steam alarm function 416 every 5 minutes. In embodiments, the overall health function may provide a result of "good health" or "poor health," depending on the average temperature and humidity values collected. The steam alarm may be activated depending on the average humidity and pressure values collected.

FIG. 5 is an illustration of a deployment model definition 502, according to some embodiments.

In the depicted embodiment, the deployment model definition (e.g., "deployment model") may be generated by the dynamic adaptation service as an optimal deployment model based on the workload definition, client resources, and/or constraint(s), as described herein. The deployment model assigns different portions (functions) of the workload to different resources. In embodiments, the service deploys the different workload portions to the different resources based on the depicted deployment model (e.g., deploy "5minAvgT" function to hardware at the client network referred to as "EAI-1"). The identifier EAI-1 may stand for "edge application instance #1." In various embodiments, any suitable identifier may be used to identify particular hardware and/or software that is capable of executing one or more of the workload portions. In some embodiments, the deployment model may be displayed to a user and the user may edit the depicted deployment model in order to change where a workload portion(s) is assigned and the service will deploy the functions according to the updated assignment.

As shown, the deployment model indicates the "outputs" of functions as well as the location (e.g., resource) assigned to each function. For example, the average temperature (m1.5MinAvgT) is calculated by a function (a workload portion) at the hardware resource "EAI-1" at the client's network. The average humidity, average pressure, and the steam alarm are each performed by a different function (workload portion) at the hardware resource "EAI-2" of the client's network (e.g., edge application instance #2). Finally, the overall health (m1.OverallHealth) is calculated by a workload portion (another workload portion) at the provider network (e.g., at the dynamic adaptation service). In the depicted example, the provider resource is identified as "US-West.service1." In various embodiments, any suitable identifier may be used to identify a hardware and/or software resource at the provider network or the client network to deploy a workload portion(s) to (e.g., network address and/or another identifier).

The example deployment model also describes "connections" (e.g., what needs to be routed from one location (source) to another location (destination)). For example, configuration of a machine-to-machine protocol for the temperature sensor may be sent from a location at the client network or provider network (for example, a default location of configuration files or a particular location) to EAI-1. As shown, the averages of the temperature, humidity, and pressure that are output from the different workload portions (e.g., functions) are sent from EAI-1 or EAI-2 to another workload portion ( )at the provider network (e.g., to the m1.OverallHealth function running as one of the workload portions 112 at the provider network).

Figure 6:
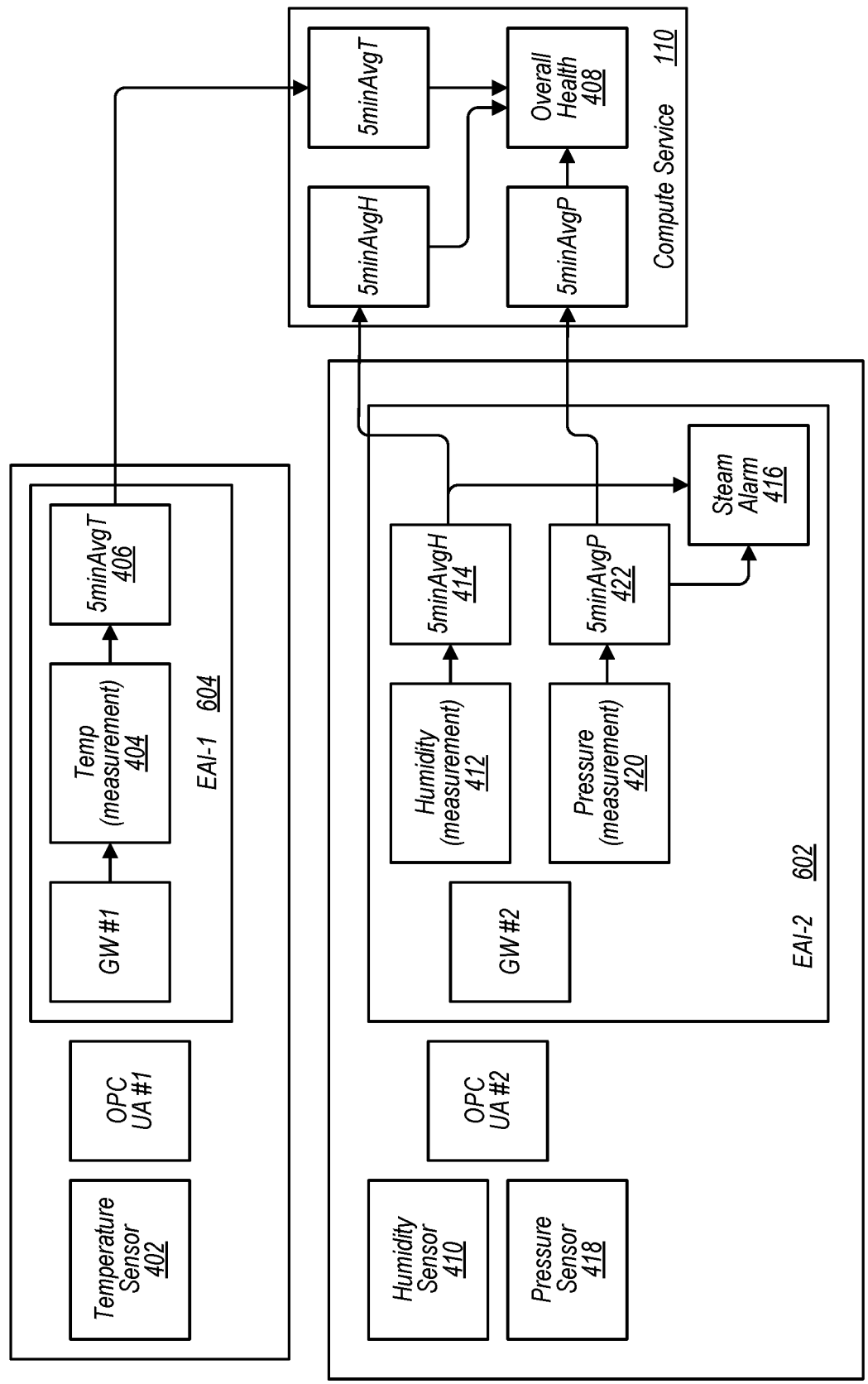
FIG. 6 is a logical block diagram illustrating portions of a workload deployed across resources, according to some embodiments.

FIG. 6 is a logical block diagram illustrating portions of a workload deployed across resources, according to some embodiments.

In the example embodiment, the portions of the workload are deployed to the different resources in accordance with the assignments indicated by the deployment model of FIG. 5. As shown, the workload portion that calculates the "overall health" has been deployed to the compute service 110 of a provider network (e.g., the provider network 102). In the depicted example, the overall health may represent a health of a system (e.g., equipment, machines) at the client's site, calculated based on data collected from environmental sensors (e.g., temperature, pressure, humidity).

The workload portion that triggers a steam alarm based on humidity and pressure measurements is deployed to the hardware resource EAI-2 602 at the client's network/site. The functions that calculate average humidity and average pressure are also deployed to EAI-2. Finally, the function that calculates the average temperature is deployed to the hardware resource EAI-1 604 at the client's network/site. In the example embodiment, EAI-1 includes a gateway (GW#1) that receives temperature data from the temperature sensor 402 via a machine-to-machine communication protocol ("OPC UA#1"). Similarly, EAI-2 includes a gateway (GW#2) that receives temperature data from the humidity and pressure sensors via another machine-to-machine communication protocol ("OPC UA#2"). The gateways may include any type of hardware and/or software that is configured to communicate with a data source (e.g., sensors) via a communication protocol that is compatible with the data source.

Figure 7:
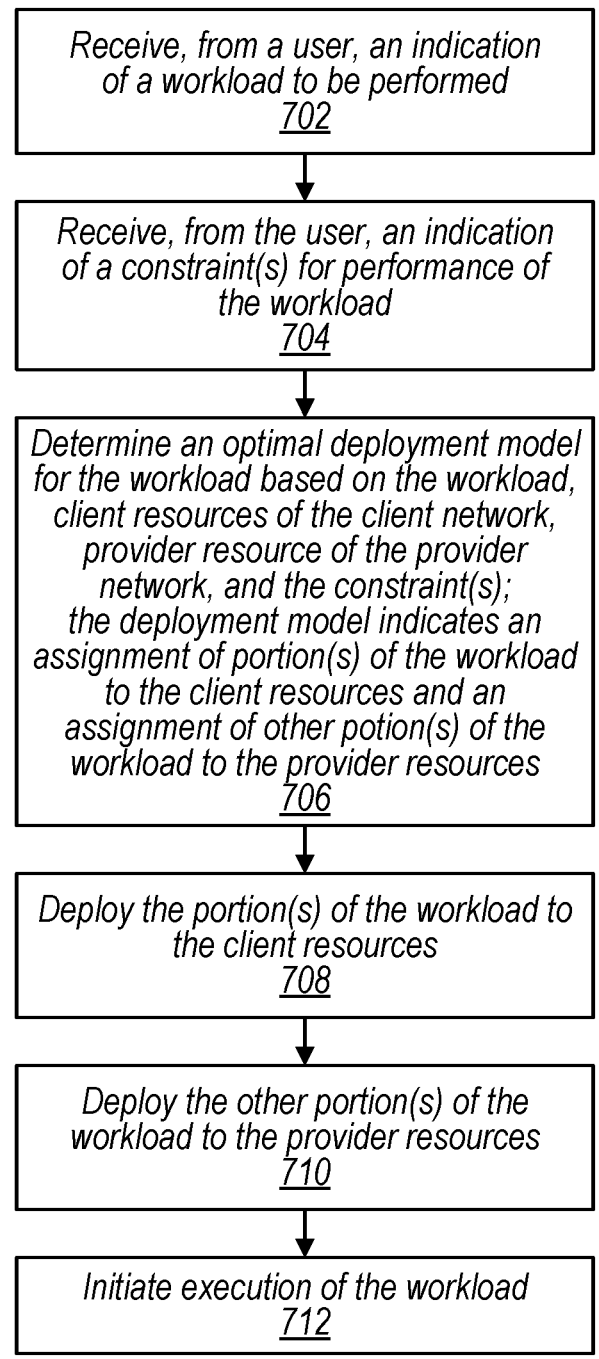
FIG. 7 is a high-level flowchart illustrating various methods and techniques to implement deployment of IoT workloads across resources, according to some embodiments.

FIG. 7 is a high-level flowchart illustrating various methods and techniques to implement deployment of IoT workloads across resources, according to some embodiments. In various embodiments, any of the functionality described for any portions of the flowcharts 7-9 may be performed by any of the components of FIGS. 1-6 and/or 10.

Figure 8:
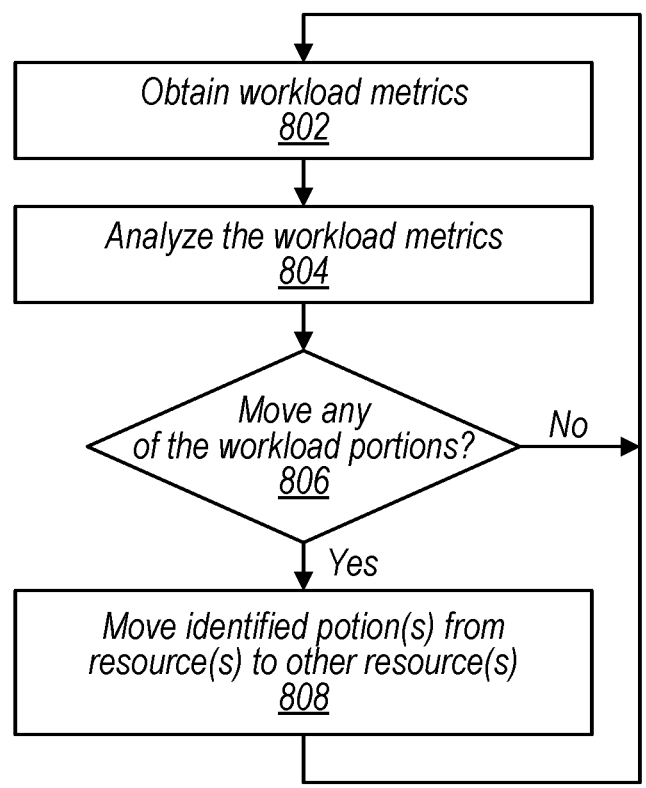
FIG. 8 is a high-level flowchart illustrating various methods and techniques to implement dynamic adaptation of IoT workloads across resources, according to some embodiments.
Figure 9:
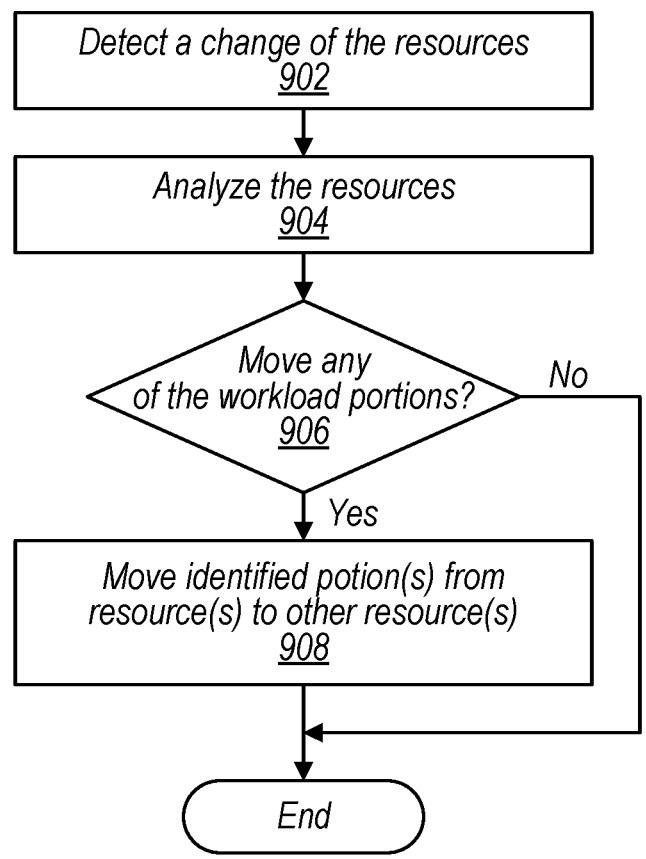
FIG. 9 is a high-level flowchart illustrating various methods and techniques to implement dynamic adaptation of IoT workloads across resources, according to some embodiments.

These techniques, as well as the techniques discussed with regard to FIGS. 8 and 9, may be implemented using components or systems as described above with regard to FIGS. 1-6, as well as other types of components or systems, and thus the following discussion is not intended to be limiting as to the other types of systems that may implement the described techniques. For example, the techniques may be implemented by a workload adaptation service of a provider network and/or a local service/application of a client network.

At block 702, a workload adaptation service receives, from a user, an indication of a workload to be performed. At block 704, the workload adaptation service receives, from the user, an indication of a one or more constraints for performance of the workload.

At block 706, the workload adaptation service determines an optimal deployment model for the workload based on the workload, client resources of the client network, provider resource of the provider network, and the constrain(s). The workload deployment model may indicate an assignment of one or more portions of the workload to the client resources and an assignment of one or more other portions of the workload to the provider resources.

Note that in some embodiments, the workload adaptation service may be used to determine an optimal deployment model for deployment of workload portions to different resources of the same network (e.g., resources that are part of the same client network and/or at the same client site). For example, the workload may determine an optimal deployment model for the workload based on the workload, different available client resources of the client network, and the constraint(s). The workload deployment model may indicate an assignment of any number of different portions of the workload to any number of different client resources. For example, the workload deployment model may assign two portions to and client server, another potion to a different server, and three other portions to yet another server. Therefore, in some embodiments, a workload adaptation service may be used in the same or similar way as described herein, except the deployment may be for different resources at the same network.

At block 708, the workload adaptation service deploys the one or more portions of the workload to one or more client resources according to the assignments of the workload deployment model. At block 710, the workload adaptation service deploys the one or more other portions of the workload to one or more provider resources according to the assignments of the workload deployment model. At block 712, the workload adaptation service causes initiation of the execution of the workload (e.g., execution of some or all of the portions).

FIG. 8 is a high-level flowchart illustrating various methods and techniques to implement dynamic adaptation of IoT workloads across resources, according to some embodiments.

At block 802, the workload adaptation service obtains workload metrics that indicate one or more metrics for performance of the workload (e.g., latency between portions, amount of data transmitted between portions over a pre-defined period of time, accuracy of results of one or more portions, amount of time required to process data by one or more portions). At block 804, the workload adaptation service analyzes the workload metrics.

At block 806, the workload adaptation service determines, based on the analysis, whether to move one or more of the workload portions from one resource to another resource (e.g., from a provider resource to a client resource or vice-versa). If so, then at block 808, the workload adaptation service moves the identified one or more workload portions from one resource to another resource. For example, the service may move one or more portions from one or more client resources to one or more provider resources and/or the service may move one or more portions from one or more provider resources to one or more client resources. The process then returns to block 802. Returning to block 806, if the workload adaptation service determines not to move any portion, then the process returns to block 802.

FIG. 9 is a high-level flowchart illustrating various methods and techniques to implement dynamic adaptation of IoT workloads across resources, according to some embodiments.

At block 902, the workload adaptation service detects a change of the resources (e.g., a change of the client and/or provider resources). At block 904, the workload adaptation service analyzes the resources (e.g., the updated resource configuration after the changes).

At block 906, the workload adaptation service determines, based on the analysis, whether to move one or more of the workload portions from one resource to another resource (e.g., from a provider resource to a client resource or vice-versa). If so, then at block 908, the workload adaptation service moves the identified one or more workload portions from one resource to another resource. For example, the service may move one or more portions from one or more client resources to one or more provider resources and/or the service may move one or more portions from one or more provider resources to one or more client resources. The process then returns to block 902. Returning to block 906, if the workload adaptation service determines not to move any portion, then the process returns to block 902.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of the workload adaptation service, provider resources, client resources, and any other components that implement the techniques described herein). The various methods as illustrated in the figures and described herein represent example embodiments of methods. The order of any method may be changed, and various elements may be added, reordered, combined, omitted, modified, etc.

Figure 10:
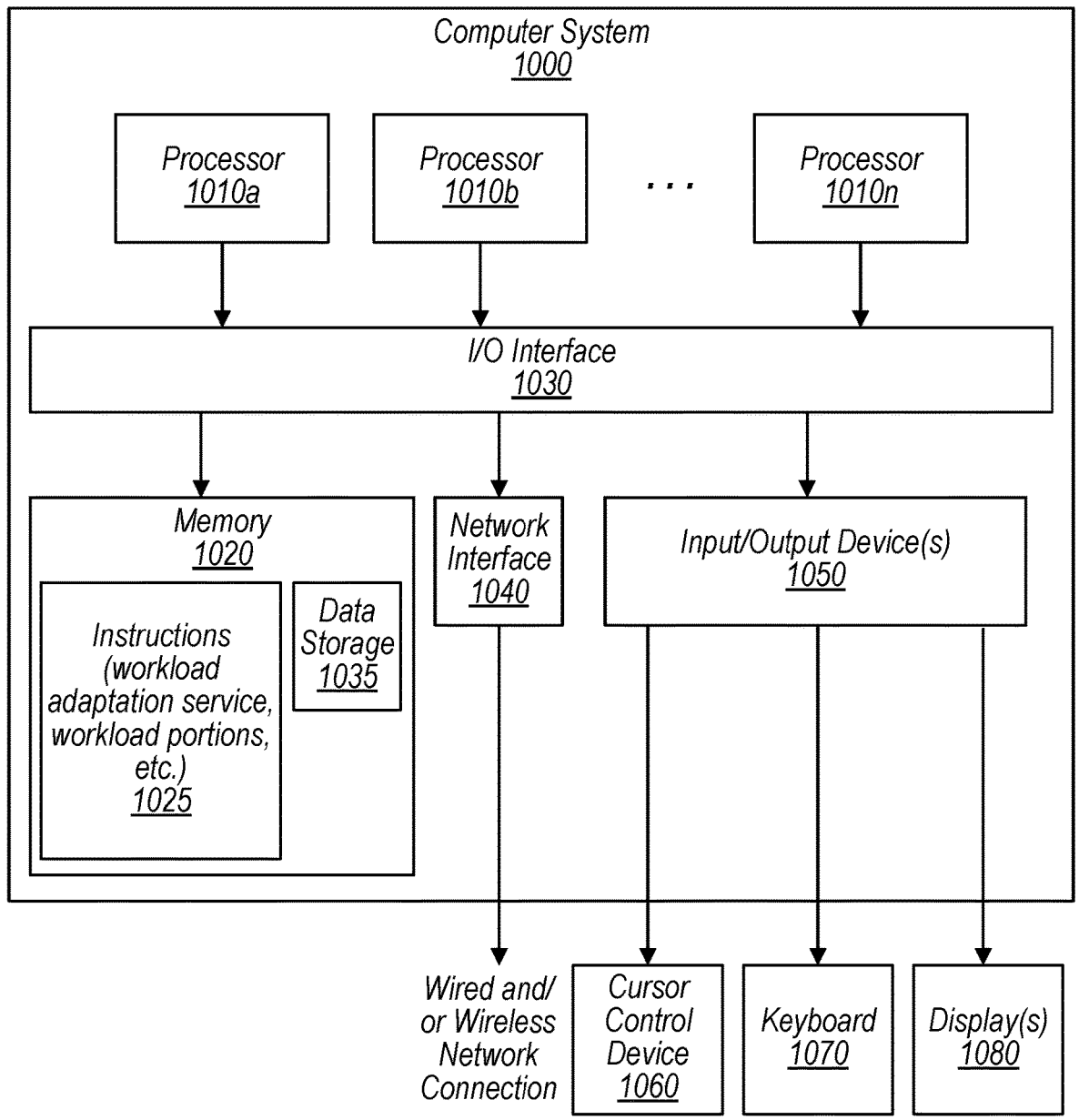
FIG. 10 is a block diagram illustrating an example computing system, according to some embodiments.

Embodiments to implement smart deployment of industrial IoT workloads across resources as described herein may be executed on one or more computer systems, which may interact with various other systems or devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., workload adaptation service, provider resources, client resources, and any other components, etc.) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments (e.g., models, functions, telemetry data, etc.). In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors, cause the one or more processors to implement a workload adaptation service for a plurality of clients, wherein the workload adaptation service is configured to, for individual clients:
receive, based on user input, an indication of a workload to be performed and at least one constraint for performance of the workload, wherein the at least one constraint comprises a maximum amount of time for output of a first portion of the workload to be received by a second portion of the workload;
determine a deployment model for the workload, wherein the determination takes into account the workload, one or more available client resources of a remote network of the client, one or more available provider resources of the provider network, and the at least one constraint for performance of the workload, and wherein the deployment model indicates:
an assignment of one or more portions of the workload for deployment to one or more of the client resources; and
an assignment of one or more other portions of the workload for deployment to one or more of the provider resources,
wherein the first portion and the second portion of the workload are assigned for deployment to one of the client resources or to one of the provider resources based on the maximum amount of time for the output of the first portion of the workload to be received by the second portion of the workload; and
deploy the one or more portions of the workload to the one or more client resources and the one or more other portions of the workload to the one or more provider resources.

2. The system of claim 1, wherein the indication of the at least one constraint comprises one or more of:
an indication that at least one of the portions of the workload is to be executed at the remote network of the client, or
an indication that at least one of the other portions of the workload is to be executed at the provider network.

3. The system of claim 1, wherein the indication of the at least one constraint further comprises one or more of:
a maximum amount of data that can be uploaded from the network of the client to the provider network over a predefined period of time, or
a maximum amount of data that can be downloaded to the network of the client from the provider network over another predefined period of time.

4. The system of claim 1, wherein the workload adaptation service is further configured to, during execution of the workload:

determine that an amount of data uploaded from at least one of the portions of the workload at the client resources to the provider resources over a predefined period of time is above a threshold amount;

in response to the determination that the amount of data uploaded over the predefined period of time is above the threshold amount, identify at least one of the other portions of the workload at the provider resources that, if executed at the client resources, would reduce the amount of data uploaded over the predefined period of time; and in response to identification of the at least one of the other portions of the workload, move the at least one of the other portions of the workload to at least one of the client resources.

5. The system of claim 1, wherein the workload adaptation service is further configured to, during execution of the workload:

detect a change in the client resources;

in response to the detection, analyze the client resources;

based on the analysis, identify at least one of the other portions of the workload at the provider resources that, if executed at the client resources, would reduce an amount of time for the workload to process data; and in response to identification of the at least one of the other portions of the workload, move the at least one of the other portions of the workload to at least one of the client resources.

6. A method, comprising:

performing, by one or more computing devices that implement a workload adaptation service of a provider network:

receiving, based on user input, an indication of at least one constraint for performance of a workload, wherein the at least one constraint comprises a maximum amount of time for output of a first portion of the workload to be received by a second portion of the workload;

determining a deployment model for the workload, wherein the determination takes into account the workload, one or more client resources of a remote network of a client, one or more provider resources of the provider network, and the at least one constraint for performance of the workload, and wherein the deployment model indicates:

an assignment of one or more portions of the workload to one or more of the client resources; and an assignment of one or more other portions of the workload to one or more of the provider resources, wherein the first portion and the second portion of the workload are assigned for deployment to one of the client resources or to one of the provider resources based on the maximum amount of time for the output of the first portion of the workload to be received by the second portion of the workload; and deploying the one or more portions of the workload to the one or more client resources and the one or more other portions of the workload to the one or more provider resources.

7. The method as recited in claim 6, wherein the indication of the at least one constraint comprises one or more of:

an indication that at least one of the portions of the workload is to be executed at the remote network of the client, or an indication that at least one of the other portions of the workload is to be executed at the provider network.

8. The method as recited in claim 6, wherein the indication of the at least one constraint comprises one or more of:

a maximum amount of data that can be uploaded from the network of the client to the provider network over a predefined period of time, a maximum amount of data that can be downloaded to the network of the client from the provider network over another predefined period of time.

9. The method as recited in claim 6, further comprising:

obtaining metrics based on execution of the workload;

analyzing the metrics;

identifying, based on the analysis, at least one of the other portions of the workload at the provider resources that, if executed at the client resources, would reduce an amount of time for the workload to process data; and moving the at least one of the other portions of the workload to at least one of the client resources.

10. The method as recited in claim 6, further comprising:

obtaining metrics based on execution of the workload;

analyzing the metrics;

identifying, based on the analysis, at least one of the portions of the workload at the client resources that, if executed at the provider resources, would reduce an amount of time for the workload to process data; and moving the at least one of the portions of the workload to at least one of the provider resources.

11. The method as recited in claim 6, further comprising:

detecting a change in the client resources;

in response to the detection, analyze the client resources;

based on the analysis, identifying at least one of the portions of the workload at the client resources that, if executed at the provider resources, would reduce an amount of time for the workload to process data; and in response to the identifying of the at least one of the portions of the workload, moving the at least one of the portions of the workload to at least one of the provider resources.

12. The method as recited in claim 6, wherein the indication of the at least one constraint comprises:

a minimum amount of storage capacity to be available for at least one of the portions or the other portions of the workload.

13. The method as recited in claim 6, wherein the indication of the at least one constraint comprises:

a minimum amount of compute capacity to be available for at least one of the portions or the other portions of the workload.

14. The method as recited in claim 6, further comprising:

receiving, based on other user input, an indication of the workload by selecting the workload from among a plurality of workloads available for selection at the workload adaptation service.

15. One or more non-transitory computer-accessible storage media storing program instructions that when executed on or across one or more processors of a provider network cause the one or more processors to implement a workload adaptation service to:

receive, based on user input, an indication of at least one constraint for performance of a workload, wherein the at least one constraint comprises a maximum amount of time for output of a first portion of the workload to be received by a second portion of the workload;

determine a deployment model for the workload, wherein the determination takes into account the workload, one or more client resources of a remote network of a client, one or more provider resources of the provider network, and the at least one constraint for performance of the workload, and wherein the deployment model indicates:
  an assignment of one or more portions of the workload to one or more of the client resources; and
  an assignment of one or more other portions of the workload to one or more of the provider resources,
  wherein the first portion and the second portion of the workload are assigned for deployment to one of the client resources or to one of the provider resources based on the maximum amount of time for the output of the first portion of the workload to be received by the second portion of the workload; and
perform one or more of:
  send an indication of the deployment model to a destination, or
  deploy the one or more portions of the workload to the one or more client resources and the one or more other portions of the workload to the one or more provider resources.

16. The one or more storage media as recited in claim 15, wherein the indication of the at least one constraint comprises one or more of:
  an indication that at least one of the portions of the workload is to be executed at the remote network of the client, or
  an indication that at least one of the other portions of the workload is to be executed at the provider network.

17. The one or more storage media as recited in claim 15, wherein the indication of the at least one constraint comprises:
  a maximum amount of data that can be downloaded to the network of the client from the provider network over a predefined period of time.

18. The one or more storage media as recited in claim 15, wherein the indication of the at least one constraint comprises:
  a maximum amount of data that can be uploaded from the network of the client to the provider network over a predefined period of time.

19. The one or more storage media as recited in claim 15, wherein the program instructions when executed on or across the one or more processors further cause the one or more processors to:
  obtain metrics based on execution of the workload;
  analyze the metrics;
  identify, based on the analysis, at least one of the other portions of the workload at the provider resources that, if executed at the client resources, would reduce an amount of time for the workload to process data; and
  move the at least one of the other portions of the workload to at least one of the client resources.

20. The one or more storage media as recited in claim 15, wherein the program instructions when executed on or across the one or more processors further cause the one or more processors to:
  obtain metrics based on execution of the workload;
  analyze the metrics;
  identify, based on the analysis, at least one of the portions of the workload at the client resources that, if executed at the provider resources, would reduce an amount of time for the workload to process data; and
  move the at least one of the portions of the workload to at least one of the provider resources.

* * * * *